US011057217B2

(12) United States Patent
Xie

(10) Patent No.: US 11,057,217 B2
(45) Date of Patent: *Jul. 6, 2021

(54) PERFORMING PARALLEL EXECUTION OF TRANSACTIONS IN A DISTRIBUTED LEDGER SYSTEM

(71) Applicant: Advanced New Technologies Co., Ltd., Grand Cayman (KY)

(72) Inventor: Guilu Xie, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,696

(22) Filed: Jul. 31, 2020

(65) Prior Publication Data
US 2020/0366494 A1 Nov. 19, 2020

Related U.S. Application Data

(63) Continuation of application No. 16/670,587, filed on Oct. 31, 2019, which is a continuation of application No. PCT/CN2019/082564, filed on Apr. 12, 2019.

(51) Int. Cl.
*H04L 9/32* (2006.01)
*H04L 9/30* (2006.01)
(Continued)

(52) U.S. Cl.
CPC ............ *H04L 9/3239* (2013.01); *H04L 67/10* (2013.01)

(58) Field of Classification Search
CPC ... H04L 9/3239; H04L 9/0637; H04L 9/0643; G06F 16/9027
(Continued)

(56) References Cited

U.S. PATENT DOCUMENTS 9,594,644 B2 3/2017 Abouzour et al.
10,255,108 B2 4/2019 Dillenberger et al.
(Continued)

FOREIGN PATENT DOCUMENTS

CN 106980649 7/2017
CN 107402824 11/2017
(Continued)

OTHER PUBLICATIONS

Kalthoff, "Scheduling of parallel processing systems based on algorithmic skeletons," Proceedings of PDSE '97: 2nd International Workshop on Software Engineering for Parallel and Distributed Systems, May 1997, pp. 234-242.
(Continued)

*Primary Examiner* — Haresh N Patel
(74) *Attorney, Agent, or Firm* — Fish & Richardson P.C.

(57) ABSTRACT

Disclosed herein are methods, systems, and apparatus for performing parallel execution of transactions in a blockchain network. One method includes receiving multiple transactions; determining whether each transaction is a first-type or a second-type transaction; for a first-type transaction, determining accounts affected by the first-type transaction; for a second-type transaction, pre-executing the second-type transaction; and determining accounts affected by the pre-executing the second-type transaction; performing a consensus process of the multiple transactions and the accounts affected by the pre-executing the second-type transaction; dividing the multiple transactions into groups; executing groups of transactions in parallel; committing the executing each first-type transaction; if the each of the accounts affected by the executing a second-type transaction are the same as accounts affected by the pre-executing of the second-type transaction and the accounts affected by the executing the second-type transaction are not affected by
(Continued)

any previously executed transactions, committing the executing the second-type transaction.

20 Claims, 7 Drawing Sheets

(51) Int. Cl.
*G06F 21/00* (2013.01)
*H04L 29/08* (2006.01)

(58) Field of Classification Search
USPC .......................................................... 713/168
See application file for complete search history.

(56) References Cited

U.S. PATENT DOCUMENTS

| | | | |
|---|---|---|---|
| 2010/0287554 | A1 | 11/2010 | Amundsen et al. |
| 2016/0350749 | A1* | 12/2016 | Wilkins ............... G06Q 20/382 |
| 2017/0212781 | A1 | 7/2017 | Dillenberger et al. |
| 2018/0096360 | A1* | 4/2018 | Christidis .............. G06Q 20/02 |
| 2018/0158034 | A1 | 6/2018 | Hunt et al. |
| 2018/0276668 | A1 | 9/2018 | Li |
| 2019/0018984 | A1 | 1/2019 | Setty et al. |
| 2019/0044714 | A1 | 2/2019 | Parker et al. |
| 2019/0058580 | A1 | 2/2019 | Tormasov et al. |
| 2019/0081793 | A1* | 3/2019 | Martino ................ H04L 9/0894 |
| 2019/0087446 | A1 | 3/2019 | Sharma et al. |
| 2019/0087793 | A1 | 3/2019 | Dickerson et al. |
| 2019/0087893 | A1* | 3/2019 | Pellew ............... G06Q 20/3825 |
| 2019/0108498 | A1 | 4/2019 | Deshpande et al. |
| 2019/0108518 | A1 | 4/2019 | Asif et al. |
| 2019/0149600 | A1* | 5/2019 | Duan ...................... G06F 21/64 |
| | | | 380/28 |
| 2019/0188711 | A1 | 6/2019 | Wu et al. |
| 2019/0236298 | A1* | 8/2019 | Agarwal ............... H04L 9/3239 |
| 2019/0236598 | A1 | 8/2019 | Padmanabhan |
| 2019/0238316 | A1 | 8/2019 | Padmanabhan |
| 2019/0244207 | A1 | 8/2019 | Samuel |
| 2019/0281065 | A1 | 9/2019 | Xia et al. |
| 2019/0287082 | A1 | 9/2019 | Song et al. |
| 2019/0287101 | A1 | 9/2019 | Xia et al. |
| 2019/0327082 | A1* | 10/2019 | Ow ........................ H04L 9/3213 |
| 2019/0334715 | A1* | 10/2019 | Gray ...................... G06F 21/64 |
| 2019/0334726 | A1* | 10/2019 | Kelly .................... H04L 9/3239 |
| 2019/0334920 | A1* | 10/2019 | Kelly .................... H04L 9/3239 |
| 2019/0340269 | A1* | 11/2019 | Biernat ................. G06F 16/248 |
| 2019/0354397 | A1 | 11/2019 | Goel et al. |
| 2019/0361731 | A1 | 11/2019 | Qiu |
| 2019/0362423 | A1 | 11/2019 | Hosman et al. |
| 2019/0363873 | A1* | 11/2019 | Fry ........................ G06Q 30/08 |
| 2019/0386995 | A1 | 12/2019 | Chafe et al. |
| 2020/0005255 | A1* | 1/2020 | Wu ....................... G06F 21/602 |
| 2020/0013025 | A1* | 1/2020 | Verma ................... H04L 9/3297 |
| 2020/0021602 | A1* | 1/2020 | Irazabal ................ H04L 9/0637 |
| 2020/0034448 | A1* | 1/2020 | Sato ..................... G06Q 20/223 |
| 2020/0034453 | A1* | 1/2020 | Sato ..................... G06F 21/602 |
| 2020/0034469 | A1* | 1/2020 | Sato ..................... G06F 16/1834 |
| 2020/0044824 | A1 | 2/2020 | Xie et al. |
| 2020/0052884 | A1* | 2/2020 | Tong ..................... H04L 63/123 |
| 2020/0167741 | A1* | 5/2020 | Gamaroff ............... G06Q 20/20 |
| 2020/0210402 | A1* | 7/2020 | Hu ........................ H04L 9/3239 |

FOREIGN PATENT DOCUMENTS

| | | | | |
|---|---|---|---|---|
| CN | 107451175 | A * | 12/2017 | ............ G06Q 40/04 |
| CN | 107678865 | | 2/2018 | |
| CN | 108269072 | | 7/2018 | |
| CN | 109559226 | | 4/2019 | |
| EP | 3566391 | | 11/2019 | |
| WO | WO 2018137564 | | 8/2018 | |
| WO | WO 2018157778 | | 9/2018 | |
| WO | WO 2018183148 | | 10/2018 | |
| WO | WO 2018207064 | | 11/2018 | |
| WO | WO 2019043536 | | 3/2019 | |
| WO | WO 2019072305 | | 4/2019 | |

OTHER PUBLICATIONS

Anjana et al., "An Efficient Framework for Optimistic Concurrent Execution of Smart Contracts," arXiv:1809.01326v4, Sep. 2018, 16 pages.
Crosby et al., "BlockChain Technology: Beyond Bitcoin," Sutardja Center for Entrepreneurship & Technology Technical Report, Oct. 16, 2015, 35 pages.
Dickerson et al., "Adding Concurrency to Smart Contracts," Principles of Distributed Computing, Jul. 2017, pp. 303-312.
Extended European Search Report in European Application No. 19732228.2, dated Apr. 8, 2020, 9 pages.
Extended European Search Report in European Application No. 19732237.3, dated Mar. 20, 2020, 8 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/082558, dated Jan. 14, 2020, 7 pages.
PCT International Search Report and Written Opinion in International Application No. PCT/CN2019/082564, dated Jan. 14, 2020, 7 pages.
U.S. Appl. No. 16/668,937, filed Oct. 30, 2019, Guilu Xie.
U.S. Appl. No. 16/945,749, filed Jul. 31, 2020, Guilu Xie.
U.S. Appl. No. 16/670,587, filed Oct. 31, 2019, Guilu Xie.
aelf.io [online], "A Multi-Chain Parallel Computing Blockchain Framework," Jun. 7, 2018, retrieved on May 14, 2021, retrieved from URL <https://aelf.io/gridcn/aelf_whitepaper_EN.pdf?v=1.6>, 34 pages.

* cited by examiner

PERFORMING PARALLEL EXECUTION OF TRANSACTIONS IN A DISTRIBUTED LEDGER SYSTEM

CROSS-REFERENCE TO RELATED APPLICATIONS

This application is a continuation of U.S. application Ser. No. 16/670,587, filed on Oct. 31, 2019, which is a continuation of PCT Application No. PCT/CN2019/082564, filed on Apr. 12, 2019, and each application is hereby incorporated by reference in its entirety.

TECHNICAL FIELD

This specification relates to transaction execution in a distributed ledger system.

BACKGROUND

Distributed ledger systems (DLSs), which can also be referred to as consensus networks, for example, blockchain networks, enable participating entities to securely and immutably store data. Examples of blockchain networks can include: public blockchain networks, private blockchain networks, and consortium blockchain networks. A public blockchain network is open for all entities to use the DLS and participate in the consensus process. A private blockchain network is provided for particular entity, which centrally controls read and write permissions. A consortium blockchain network is provided for a select group of entities, which control the consensus process, and includes an access control layer.

A blockchain network is a network of computing nodes that manage, update, and maintain one or more blockchain structures. A blockchain is a data structure that stores transactions in a way that allows future transactions to be verified for consistency with all prior transactions stored in the chain. The transactions are executed and recorded in the blockchain by each of the network nodes of the blockchain network.

One issue encountered in blockchain networks is the speed at which transactions are processed. Generally, network nodes in the blockchain network process transactions serially in the order they are submitted. This can lead to low transaction throughput and delays between when a transaction is submitted and when it clears.

Although a number of existing techniques can be used for executing the transactions among the network nodes of a blockchain system, a more efficient solution to executing the transactions would be advantageous.

SUMMARY

This specification describes technologies for transaction execution in a distributed ledger system (e.g., a blockchain network). These technologies generally involve performing parallel execution of transactions by a network node in a distributed ledger system. The described technologies can improve processing speed of transactions in a blockchain network and increase transaction throughput of the blockchain network.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Figure 1:
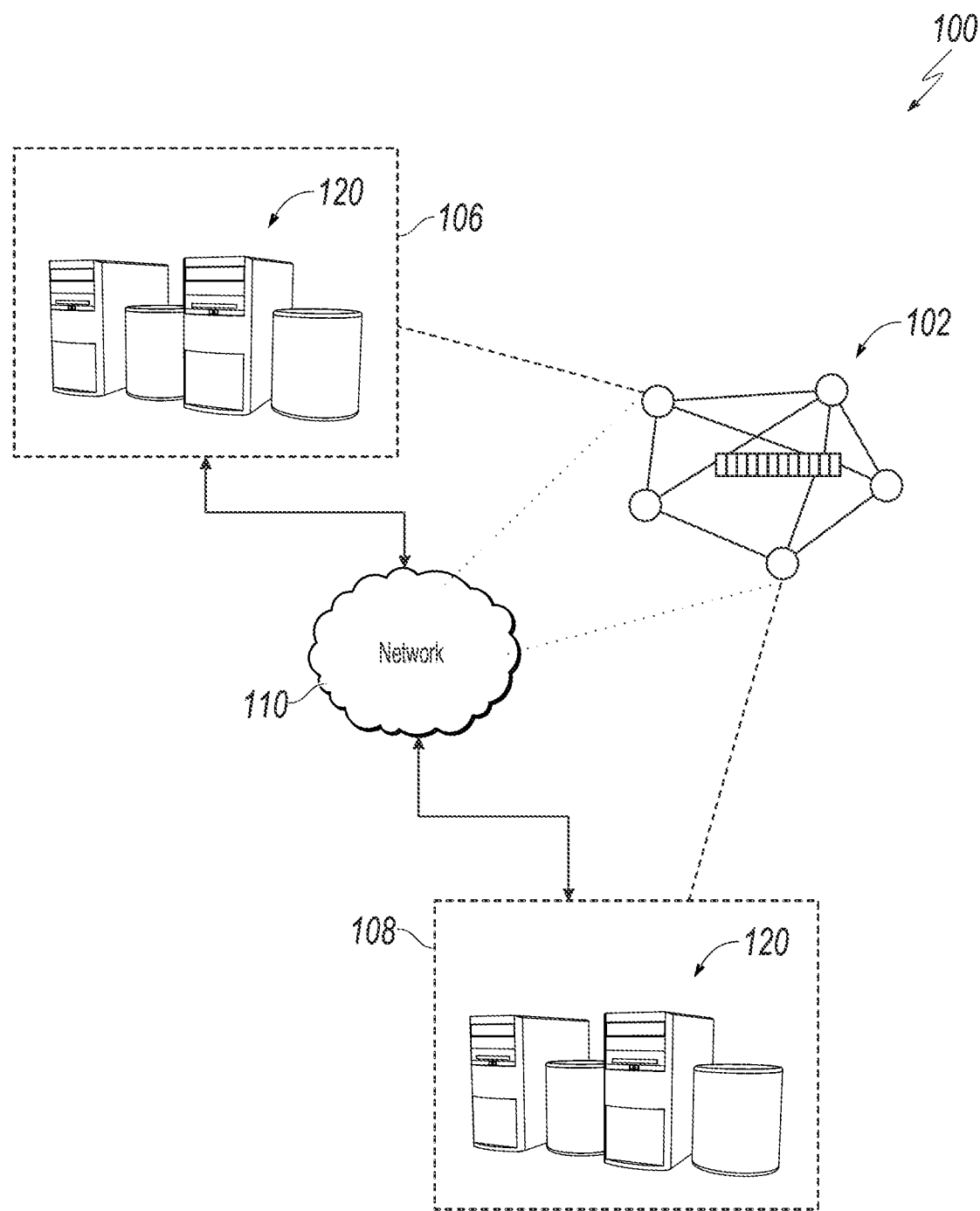
FIG. 1 depicts an example of an environment that can be used to execute implementations of the specification.

This specification describes technologies for transaction execution in a distributed ledger system (e.g., a blockchain network). These technologies generally involve performing parallel execution of transactions by a network node in a distributed ledger system. The described technologies can improve processing speed of transactions in a blockchain network and increase transaction throughput of the blockchain network.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Implementations of this specification are described in further detail herein with reference to a consortium blockchain network. It is contemplated, however, that implementations of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute implementations of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
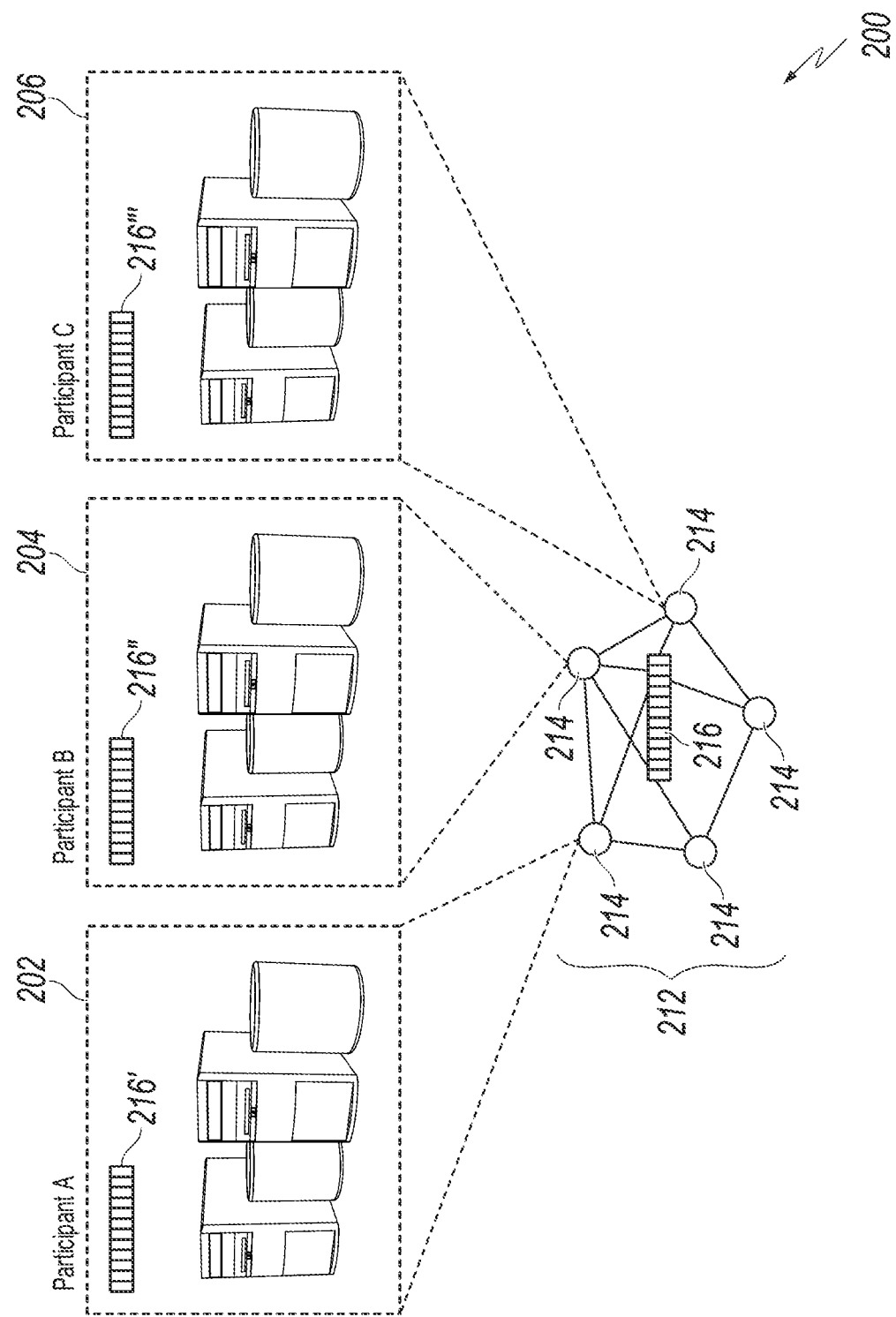
FIG. 2 depicts an example of an architecture in accordance with implementations of the specification.

FIG. 2 depicts an example of an architecture 200 in accordance with implementations of this specification. The example of the architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a number of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

A consensus version of a blockchain can be determined based on interacting with nodes of a blockchain network. For example, a web server that is a node of the blockchain network can use a longest-chain and/or a heaviest-chain criteria to select a chain of blocks as the consensus version of the blockchain from among multiple candidate paths. The multiple candidate paths can include different blocks received at different times from different nodes of the blockchain network.

As described above, a blockchain network enables participants to conduct transactions, for example, to buy/sell goods, and/or services. In some implementations, each participant is associated with one or more accounts. A transaction can involve one or more participants and execution of the transactions may affect one or more accounts of the one or more participants. As an example, a fund transfer transaction from Participant A to Participant B can result in a decrease of fund in Account A of Participant A and an increase of fund in Account B of Participant B.

In some implementations, record-keeping models are used to record transactions and the corresponding accounts between participants. Examples of record-keeping models include an unspent transaction output (UTXO) model and an account model (also referred to as account-based model or account/balance model).

In the UTXO model, the assets on the chain are in the form of transactions. Each transaction spends output from prior transactions and generates new outputs that can be spent in subsequent transactions. A participant's unspent transactions are tracked, and a balance that the participants has to spend is calculated as the sum of the unspent transactions. Each transaction takes one or more unspent outputs (and only unspent outputs) as input and can have one or more outputs. The requirement that only unspent outputs may be used in further transactions is necessary to prevent double spending and fraud.

The account model performs record-keeping and manages account balances like a traditional bank. Under this model, an account can have an address and a corresponding account balance. Assets on the chain are represented as the balance of the account. Each transfer transaction can have an account address of a transferred asset and an account address of a received asset. The transaction amount is directly updated on the balance of the account. The account model is efficient as each transaction may only need to validate that the sending account has enough balance to pay for the transaction. In addition to supporting the transaction validation and proof function, the account model can fully support smart contracts, especially those that require state information or involve multiple parties.

In some implementations, a transaction includes a message packet sent by an external account to another account on the blockchain. The transaction may include a sender's signature, a recipient's address, and a token that the sender transfers to the recipient. The transaction may also include information about a smart contract. Every transaction can be a record on the blockchain.

In some implementations, a smart contract is a computer program designed to disseminate, verify, and/or execute a contract by a data processing system, e.g., a blockchain consensus network. Smart contracts allow for trusted transactions without participation of a third party. The transactions are traceable and irreversible.

In some implementations, transactions in the blockchain system may include multiple types such as transfers, contract deployments, contract calls, contract updates, deposits, etc. In some implementations, regardless of the type of transaction, a transaction can includes a sender, a recipient, an amount of the transfer, data required for the contract, a hash of the transaction, and a signature.

In some implementations, a transaction can be categorized as a first-type transaction or a second-type transaction depending on whether all accounts affected by execution of the transaction can be pre-determined or ascertained before the execution of the transaction. For the first-type transaction, one or more accounts affected by execution of the first-type transaction can be pre-determined before the execution of the first-type transaction. Examples of the first-type transaction can include a fund transfer transaction as described above, where the accounts (e.g., Account A of Participant A and Account B of Participant B) affected by the fund transfer transaction can be determined before the execution of the fund transfer transaction between Participant A and Participant B.

For the second-type transaction, one or more of the accounts affected by execution of the second-type transaction cannot be pre-determined or ascertained before the execution of the second-type transaction. Examples of the second-type transaction can include a smart contract transaction such as a call of a smart contract. A smart contract transaction can involve one or more participants in execution of a smart contract. The accounts affected by the execution of the smart contract transaction may depend on a current state of the blockchain at the time of execution, and thus cannot be ascertained before the actual execution of the smart contract transaction. As such, two or more smart contract transactions may not be executed in parallel. Because a smart contract call can lead to the execution of instructions making up the smart contract, it may not be possible to determine the scope of accounts a particular contract call will affect. For example, consider a smart contract that takes a particular account and a payment amount as parameters, and applies the payment amount to the particular account if some condition is true. Because a caller of this smart contract specifies the particular account and the condition depends on the state of the blockchain when the smart contract is executed, it may not be possible to ascertain, from the definition of the smart contract itself (e.g., its source code), which accounts a particular call to the smart contract will affect. In some implementations, the contract call may be a transaction with the potential to affect all accounts in the blockchain network. Therefore the contract call cannot be executed in parallel with any other transactions.

Figure 3A:
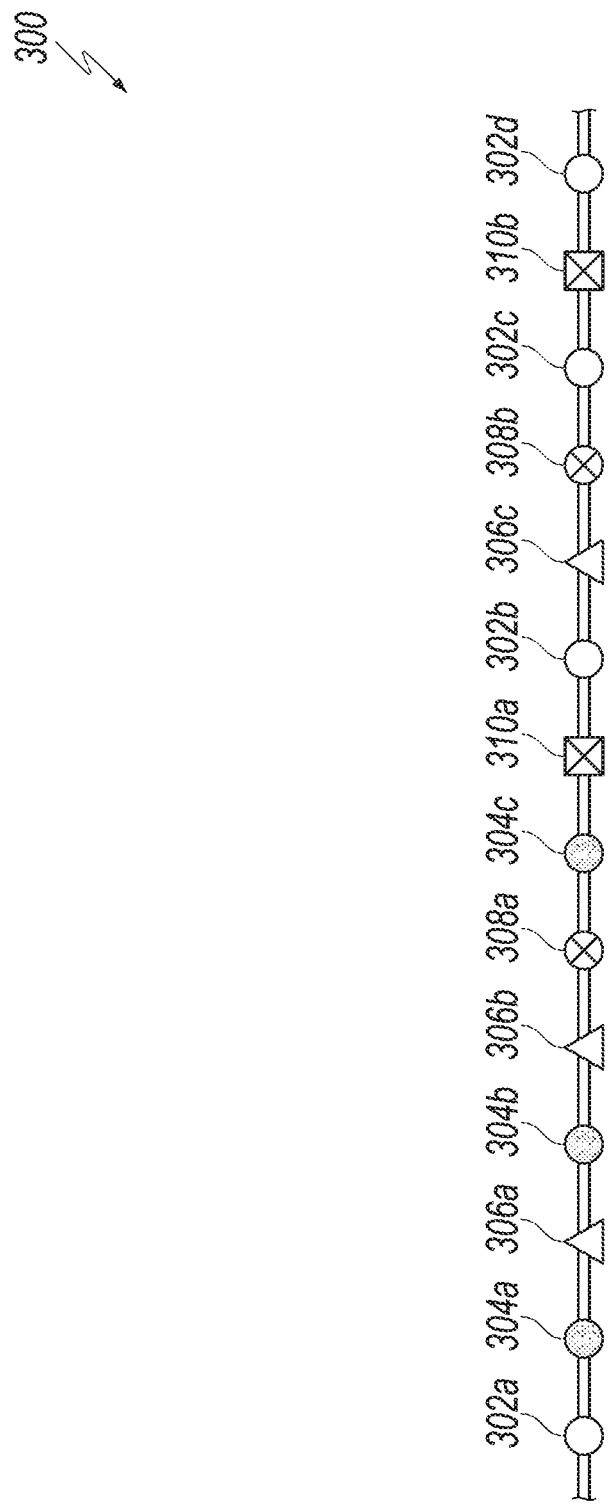
FIG. 3A depicts an example of a serial execution order for transactions in a blockchain network in accordance with implementations of the specification.

To provide further context for implementations of the specification, FIG. 3A depicts an example of a serial execution order 300 for transactions in a blockchain network in accordance with implementations of the specification. As shown, the execution order 300 includes a number of transactions (302a-d, 304a-c, 306a-c, 308a-b, and 310a-b) sequenced according to the order in which they are to be executed by network nodes of a blockchain network. The execution order 300 is a serial execution order where each individual transaction of transactions 302a-d, 304a-c, 306a-c, 308a-b and 310a-b is executed one by one. The execution order 300 can be the same execution order among all consensus nodes (e.g., network nodes that participate in a consensus protocol) of a blockchain network. For example, the execution order 300 can be an agreed execution order of the number of transactions after a consensus process performed by all consensus nodes of the blockchain network. The serial execution order 300 can be used to ensure that the final execution results of different blockchain nodes are consistent.

Among the number of transactions 302a-d, 304a-c, 306a-c, 308a-b, and 310a-b; each of the transactions 302a-d and 304a-c includes a first-type transaction, and each of the transactions 308*a-b* and 310*a-b* includes a second-type transaction such as a smart contract transaction. As mentioned, the accounts affected by execution of the second-type transaction cannot be pre-determined or ascertained before the execution of the second-type transaction because the execution of the second-type transaction may depend on a current or latest state of the blockchain in the blockchain network. In some implementations, to estimate accounts affected by execution of a second-type transaction, the second-type transaction can be pre-executed by a network node, for example, before it is the second-type transaction's turn for execution in the number of transactions.

For example, after receiving a smart contract transaction, a network node add the smart contract transaction into a transaction list in a cache. When the CPU or one of the processors or cores of the network node is idle, the network node can remove the smart contract transaction from the transaction list in the cache, and pre-execute the smart contract transaction based on the latest state of the blockchain of the network node. As such, one or more accounts affected by the pre-execution of the smart contract transaction can be determined after the pre-execution. The one or more accounts affected by the pre-execution of the smart contract transaction can be used as an estimate or prediction of one or more accounts affected by the actual execution of the smart contract transaction. In some implementations, if the one or more accounts affected by the pre-execution of the smart contract transaction are not the same as the one or more accounts affected by the actual execution of the smart contract transaction, the pre-execution of the smart contract transaction can be rolled back to undo the changes to any changes to the account due to the pre-execution. As such, the account status is not affected.

In some implementations, a network node (e.g., the network node that receives the smart contract transaction from a client and pre-executes the smart contract transaction) can record the one or more accounts affected by the pre-execution of the smart contract transaction, for example, by writing into the smart contract transaction message as an additional filed or element in a data structure of the smart contract transaction message. Both the smart contract transaction and the corresponding one or more accounts affected by the pre-execution of the smart contract transaction can be subject to a consensus process performed by all the network nodes. This can avoid repeated pre-execution operations of the smart contract transaction by other network nodes, and thus save the computational resources.

In some implementations, the number of transactions 302*a-d*, 304*a-c*, 306*a-c*, 308*a-b*, and 310*a-b* are transactions received during an epoch of a consensus process. In some implementations, a consensus process or mechanism is designed to achieve reliability in a network involving multiple nodes. For example, a blockchain network relies on consensus mechanisms to reach agreement among network nodes of the blockchain network. An epoch of a consensus represents a round of consensus among the number of network nodes of the blockchain network. For example, each network node may periodically collect pending transactions and submit their respectively received pending transactions to a consensus process so as to obtain a list of transactions to be executed by each network node in the blockchain network.

In some implementations, the order in which the transactions are received by each node may be different from the order in which the transactions are sent by participants. In some implementations, the consensus operation of each node on the transaction will further lead to the uncertainty of the transaction order of the list of transactions after the consensus is performed. In some implementations, each network node sorts or orders the number of transactions according to certain rules before executing the number of transactions, and the final execution results of each node can be consistent as long as the ordering rules or protocol of the nodes are the same among the network nodes of the blockchain network.

In some implementations, based on the one or more accounts affected by executing the first-type transaction and the one or more accounts affected by the pre-executing the second-type transaction (e.g., the estimated accounts affected by the execution of the smart contract transaction), the number of transactions can be divided into one or more groups, where accounts affected by transactions in one group do not overlap with accounts affected by transactions in another group. For example, given Transaction 1 affecting Account A and Account B, Transaction 2 affecting the Account B and Account C, Transaction 3 affects Account D and Account E, Transaction 1 and Transaction 2 affect a common account, Account B, and thus cannot be executed at the same time. As such, Transactions 1, 2, and 3 can be divided into two groups, where group I includes Transactions 1 and 2 that affect a common account, Account B, and group II includes Transaction 3. In some implementations, the relative execution order of the two transactions, Transaction 1 and Transaction 2, can be arbitrary. Group I and group II, however, can be executed in parallel as they do not affect any common account. In some implementations, as long as each network node divides the groups in the same way, and the execution order of transactions within the group is the same, a consistent final execution result of each node can be ensured.

Figure 3B:
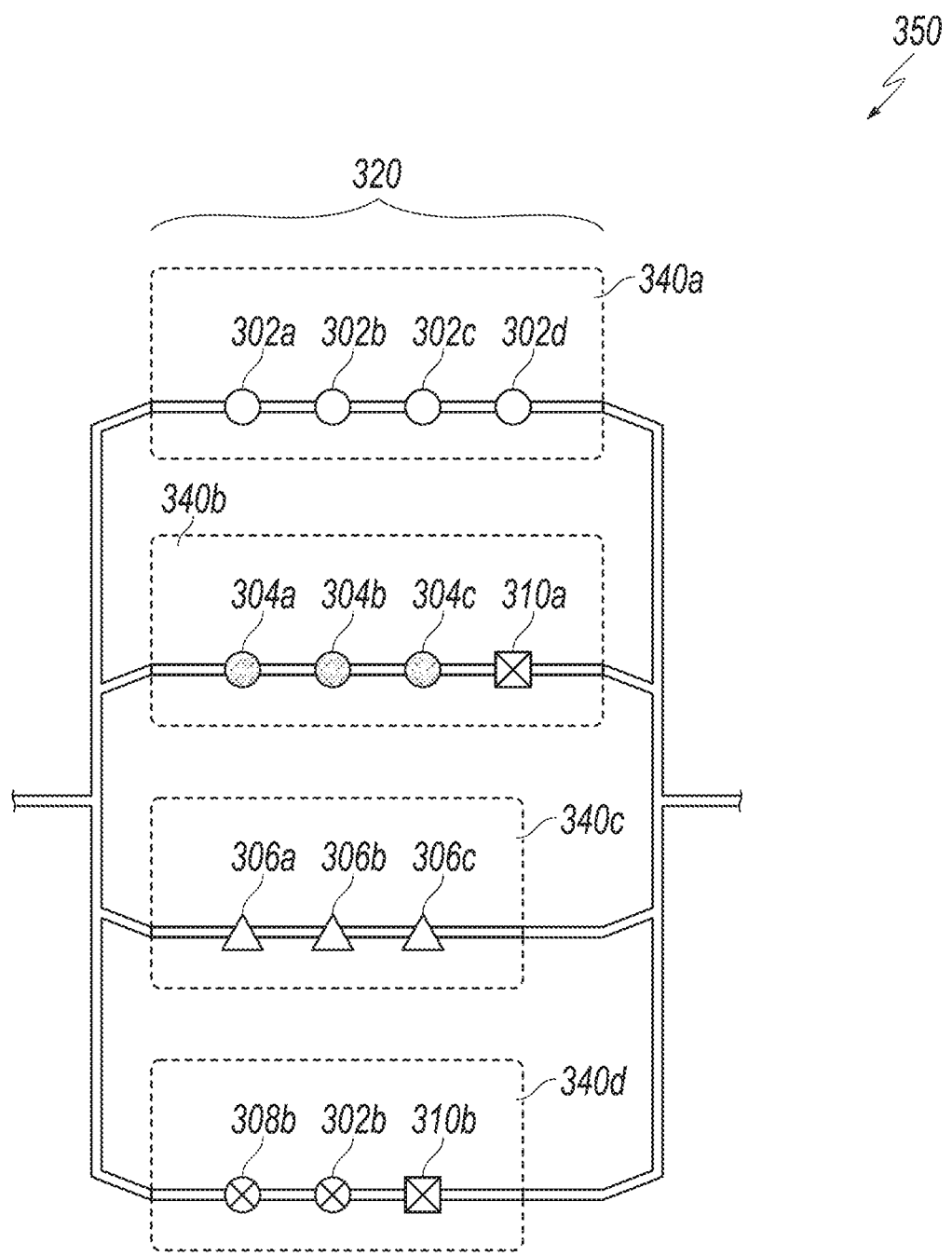
FIG. 3B depicts an example of a parallel execution order for transactions in a blockchain network in accordance with implementations of the specification.

As another example, as shown in FIG. 3B, the transactions 302*a-d*, 304*a-c*, 306*a-c*, 308*a-b*, and 310*a-b* as shown in FIG. 3A can be divided into 4 groups, for example, based on whether pre-execution of the transactions affect one or more common transaction entities (e.g., a transferee or a sender, a transferor or a receiver, or their corresponding accounts) or have dependency, for example, in affecting one or more same or common accounts. Each group can include one or more a first-type transaction, a second-type transaction, or a combination of both. As shown in FIG. 3B, a first group 340*a* of transactions includes first-type transactions 302*a-d* that affect a first common transaction entity; a second group 340*b* includes first-type transactions 304*a-c* and a second-type transaction 310*b* that affect a second common transaction entity; a third group 340*c* includes first-type transactions 306*a-c* that affect a third common transaction entity; and a fourth group 340*d* includes second-type transactions 308*a-b* and 310*a* that affect a fourth common transaction entity according to the pre-execution results of the transactions 308*a-b* and 310*a*. Between each two of the groups 340*a*, 340*b*, 340*c*, and 340*d*, transactions in one group do not affect a same account as transactions in another group do, the pre-execution results of the transactions.

If two or more transactions could affect one or more common accounts, the two or more transactions may not be executed in parallel at the same time and the two or more transactions can be grouped into a single group. In other words, with in a single group, execution of the transactions in the single group affect one or more same accounts; whereas between two different groups, one or more accounts affected by execution of the transactions in one group do not overlap with one or more accounts affected by execution of the transactions in the other group. As a result, the transactions in the single group are to be executed in serial, whereas the transactions in the different groups can be executed in parallel. The relative execution order between or among the two or more transactions may be arbitrary, for example, determined according to certain protocol or ordering rules that are agreed by all the network nodes in the blockchain network. In some implementations, as long as each network node divide the groups in the same way, and the execution order of transactions within the group is the same, a consistent final pre-execution result of each node can be ensured.

FIG. 3B depicts an example of a parallel execution order 350 for transactions in a blockchain network in accordance with implementations of the specification. According to the parallel execution order 350, the groups 340a, 340b, 340c, and 340d of transactions can be executed in parallel by the network nodes of the blockchain network. Executing the transaction groups 340a, 340b, 340c, and 304d in parallel can leverage multi-core or multi-thread processing power of each network node, and lead to increases in the processing speed and transaction throughput in the blockchain network, as the network is now executing four transactions at any one time in parallel rather than just one if all transactions were executed serially.

In some implementations, each network node of the blockchain network executes the transactions of each group in parallel, for example, according to the parallel execution order 350. The second-type transaction can be executed, for example, based on a current or latest state of the blockchain of blockchain network. In some implementations, one or more accounts affected by the actual execution of the second-type transaction may be different from the one or more accounts affected by the pre-execution of the second-type transaction because the latest state of the blockchain at the time of actual execution may be different from the latest state of the blockchain of blockchain network at the time of pre-execution, or execution of a previous transaction may affect the execution of a current second-type transaction and the one or more accounts affected by the execution of the current transaction. In this case, the execution of the second-type transaction can be rolled back or undone. Such a second-type transaction can be referred to as a failed second-type transaction and added to a list of failed second-type transactions. The list of failed second-type transactions can be re-executed serially after parallel execution of all the other transactions. In some implementations, the second-type transactions in the list of failed second-type transactions can be sorted according to certain rules agreed by all the network nodes in the blockchain network so as to ensure a consistent execution result across all the blockchain network.

Figure 3C:
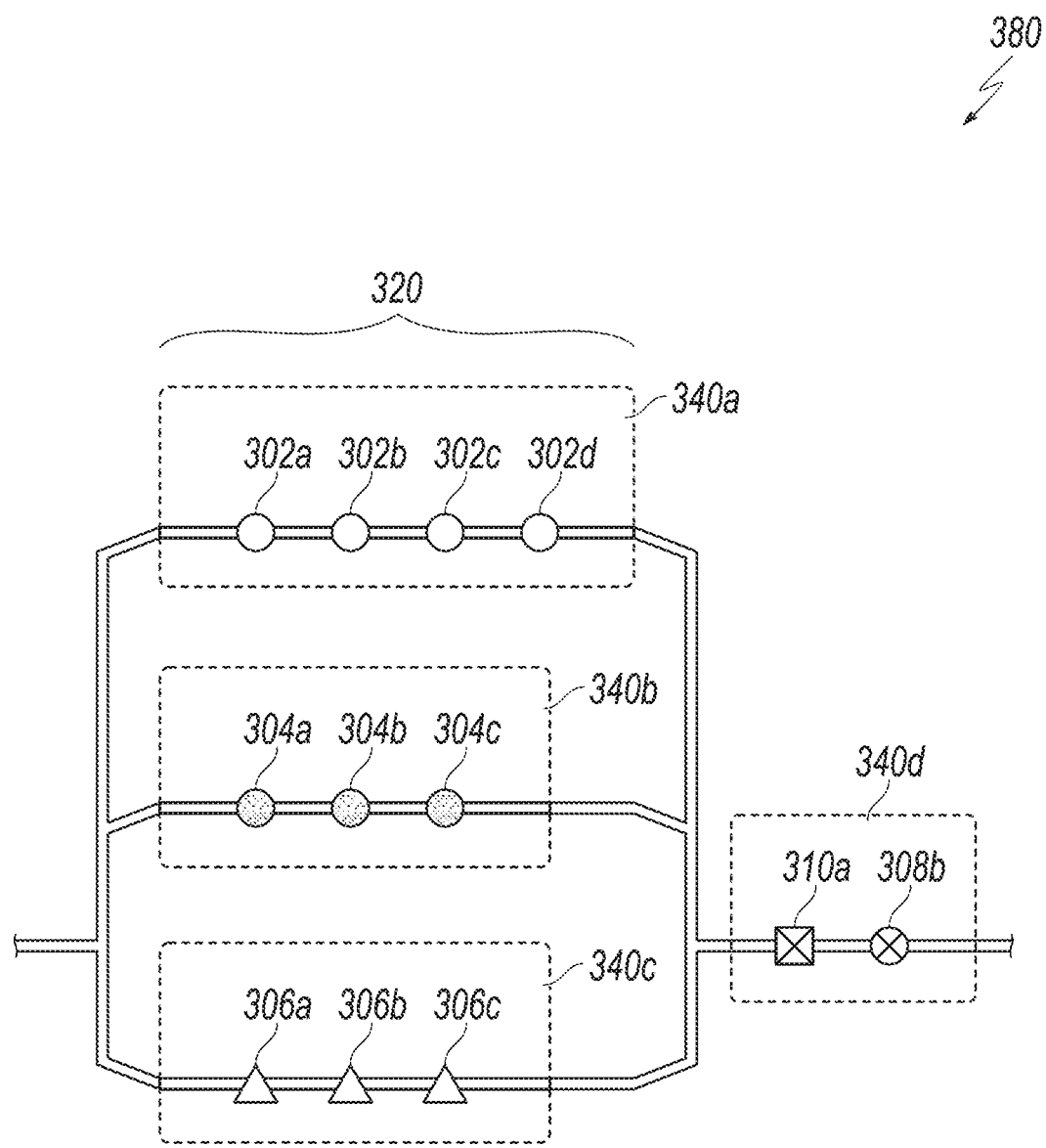
FIG. 3C depicts an example of an execution order for failed second-type transactions in a blockchain network in accordance with implementations of the specification.

FIG. 3C depicts an example of an execution order 390 for failed second-type transactions in a blockchain network in accordance with implementations of the specification. In this example, after the actual execution of the groups 340a, 340b, 340c, and 340d of second-type transactions according to the parallel execution order 350, it can be determined second-type action transactions 310a and 308b are failed second-type transaction because one or more accounts affected by the actual execution of the second-type transactions 310a and 308b are different from the one or more accounts affected by the pre-execution of the second-type transaction 310a and 308b, respectively. In this case, the actual execution of the second-type transactions 310a and 308b are rolled back. The second-type transactions 310a and 308b are put into a list of failed second-type transactions and are re-executed after the parallel execution of the actual execution of the groups 340a, 340b, 340c and 340d of transactions according to the parallel execution order 350.

In some implementations, for each network node in the blockchain network, as long as transactions are grouped according to the same rule (e.g., based on ascertained or estimated accounts affected by execution of the transactions), the order of transactions within the group is consistent, failed 340c and 340d transactions are rolled back and re-executed in serial according to a same rule after the actual execution of the other transactions, a consistent final execution result among all the network nodes in the blockchain network can be obtained.

Figure 4:
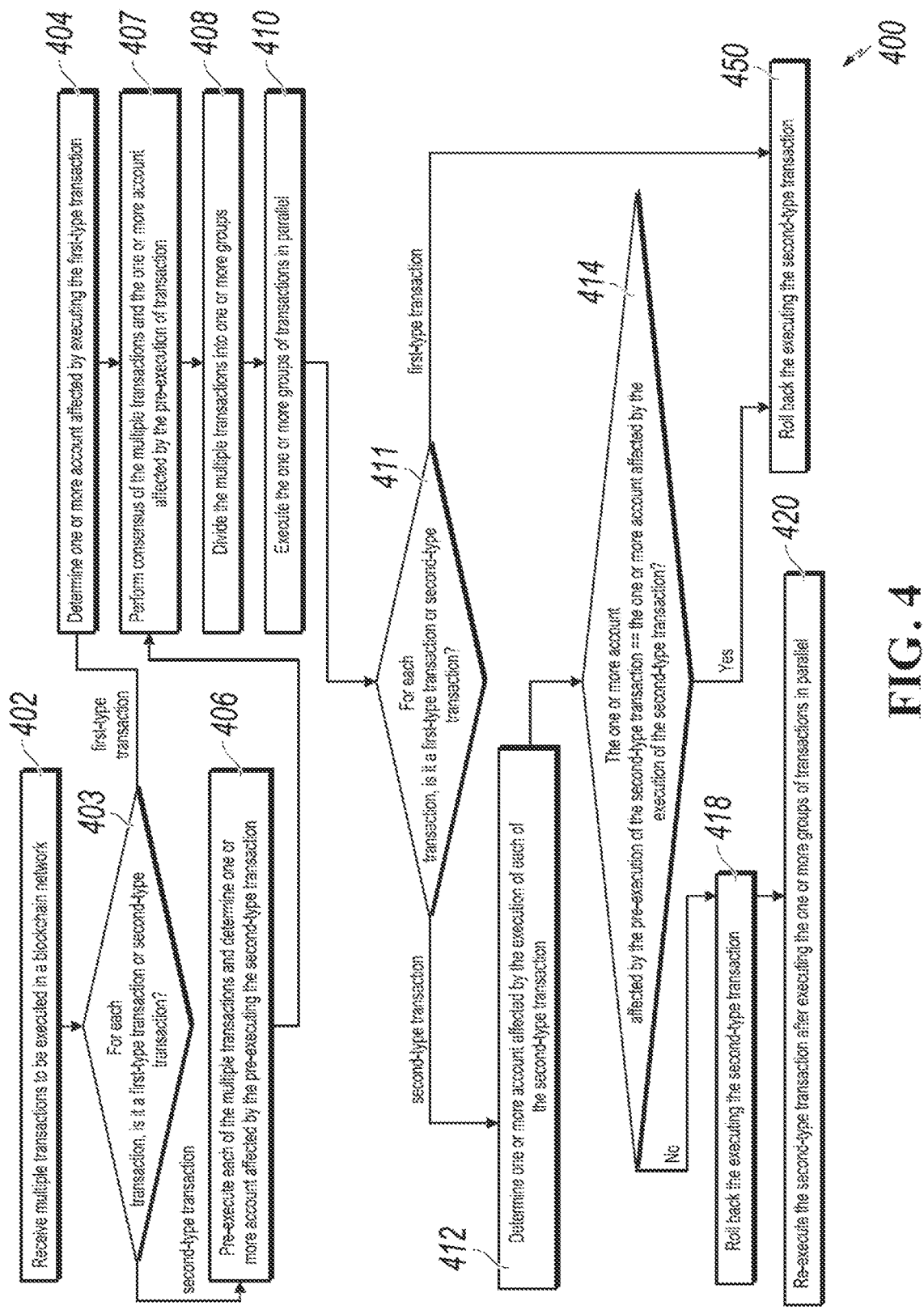
FIG. 4 depicts an example of a process that can be executed in accordance with implementations of the specification.

FIG. 4 depicts an example of a process 400 that can be executed in accordance with implementations of the specification. In some implementations, the process 400 may be performed using one or more computer-executable programs executed using one or more computing devices. For example, the process 400 may be performed by each network node in a blockchain network. For clarity of presentation, the description that follows generally describes method 400 in the context of the other figures in this description. It will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

At 402, a number of transactions to be executed in a blockchain network are received by a network node of the blockchain network. The network node is one of a number of network nodes of the blockchain network. The number of transactions can include, for example, the transactions 302a-d, 304a-c, 306a-c, 308a-b, and 310a-b as shown in FIG. 3A.

In some implementations, each of the network nodes of the blockchain network can receive a respective number of transactions to be executed in the blockchain network, for example, from one or more clients connected to the respective network nodes of the blockchain network. In some implementations, the number of transactions include all transactions received from all network nodes of the blockchain network, for example, during a time period (e.g., an epoch of a consensus process). The number of transactions can form a transaction list that is subject to a consensus process performed by all network nodes of the blockchain network.

At 403, for each of the number of transactions, it is determined whether the transaction is a first-type transaction or a second-type transaction. In some implementations, the first-type transaction includes a transaction for which one or more accounts affected by executing the transaction is deterministic (i.e., can be ascertained) before executing the transaction, while the second-type transaction includes a transaction for which one or more accounts affected by executing the transaction is not deterministic (i.e., cannot be ascertained) before executing the transaction. In other words, execution of each of the second-type transactions can affect one or more accounts but the one or more accounts cannot be pre-determined or ascertained (e.g., based on the content of the transaction) before the execution of the each of the second-type transactions. In some implementations, a pre-execution of the each of the number of transactions can be used to predict or estimate the one or more accounts affected by the actual execution of the each of the number of transactions. For example, the first-type transaction includes a non-smart-contract transaction (e.g., a fund transfer transaction or an account creation transaction) and the second-type transaction includes a smart contract transaction (e.g., a call to a smart contract).

In some implementations, the number of transactions do not need to be executed by the network node pursuant to a predetermined or mandatory order. In other words, the relative execution order among the number of transactions are not of essence as long as all the network node in the blockchain network execute the number of transactions according to a same order.

At 404, in response to determining that the transaction is a first-type transaction, one or more accounts affected by executing the first-type transaction are determined by the network node. In some implementations, the one or more accounts affected by executing the first-type transaction can be pre-determined or ascertained before the execution of the first-type transaction, for example, based on content or data of the first-type transaction. For example, the first-type transaction includes a non-smart-contract transaction, such as, a fund transfer transaction or an account creation transaction. The one or more accounts affected by such a first-type transaction can be determined, for example, by parsing the data of transaction that are received by the network node.

At 406, in response to determining that the transaction is a second-type transaction, the second-type transaction is pre-executed by the network node based on a first current state of a blockchain in the blockchain network, and one or more accounts affected by the pre-executing the second-type transaction are determined. In some implementations, the first current state of a blockchain in the blockchain network can be the current or latest state of the blockchain at the time of the pre-execution of the second-type transaction. In some implementations, the second-type transaction is pre-executed by the network node when one or more processors of the network node is idle. In some implementations, a second-type transaction can be pre-executed by the network node while the network node is receiving another second-type transaction or perform other operations, for example, by leveraging multi-core or parallel processing capabilities of the network node. In some implementations, the pre-execution of the second-type transactions can make better use of the computational resources or processing power of the network node without introducing additional delay or latency.

In some implementations, the second-type transaction that has been pre-executed can be rolled-back so as to avoid any changes to the first state of the blockchain in the blockchain network. In some implementations, the second-type transaction that has been pre-executed can be rolled-back before performing a consensus process of the number of transactions. In some implementations, the pre-execution of the second-type transaction can be performed on a copy of a data structure storing the first current state of the blockchain (e.g., a world state or global state Merkle Patricia Tree (MPT) tree) so that the first current state of the blockchain in the blockchain network remains unchanged due to the pre-executing of the second-type transaction.

In some implementations, the one or more accounts affected by the pre-executing the second-type transaction can be recorded or saved, for example, as a list or another data structure together with the second-type transaction. In some implementations, the one or more accounts affected by the pre-executing the second-type transaction can be subject to a consensus process performed by all network nodes of the blockchain network for performing consensus of the one or more accounts affected by the pre-executing the second-type transaction. By recording the one or more accounts affected by the pre-executing the second-type transaction and submit them for the consensus process by the network node can to avoid repeated pre-execution operations of the second-type transaction by other network nodes, and thus save the computational resources.

At 407, a consensus process of the number of transactions (including both the first-type and the second-type transactions) and the one or more accounts affected by the pre-executing the second-type transaction for each second-type transaction are performed by the network node. The consensus process can be performed, for example, according to a consensus algorithm or protocol adopted by the blockchain network. For example, as shown in FIG. 3A, each network node in the blockchain network can perform a consensus process of all the transactions 302a-d, 304a-c, 306a-c, 308a-b, and 310a-b and the one or more accounts affected by the pre-executing the second-type transaction for each of the second-type transactions 308a-b, and 310a-b.

At 408, the number of transactions are divided into one or more groups of transactions by the network node based on the one or more accounts affected by executing the first-type transaction for each first-type transaction and the one or more accounts affected by the pre-executing the second-type transaction for each second-type transaction. Each group of transactions include one or more transactions that affect one or more common transaction entities. Between each two different groups of transactions, any transaction in one group does not affect any common transaction entity with any second-type transaction in another group. The common second-type transaction entity can include, for example, a transferee, a transferor, an account of a transferee, or an account of a transferor associated with a transaction.

For example, FIG. 3B shows an example of a division of the transactions 302a-d, 304a-c, 306a-c, 308a-b, and 310a-b into four groups 340a-d based on the one or more accounts affected by executing the first-type transactions 302a-d, 304a-c, and 306a-c, as well as the one or more accounts affected by the pre-executing the second-type transactions 308a-b and 310a-b.

At 410, the number of transactions are executed by executing the one or more groups of transactions in parallel. For example, FIG. 3B shows an example where the transactions 302a-d, 304a-c, 306a-c, 308a-b, and 310a-b are executed by executing the four groups 340a-d of transactions in parallel according to the parallel execution order 350.

At 411, after executing the number of transactions, for each of the number of transactions, it is determined whether the transaction is a first-type transaction or a second-type transaction.

At 450, for each first-type transaction, the execution of the number of first-type transactions is committed. In some implementations, committing the execution of the first-type transaction can include one or more of writing the execution results of the number of first-type transactions into the blockchain of the blockchain network, or returning the execution results of the number of first-type transactions to one or more clients of the blockchain network.

At 412, for each second-type transaction, one or more accounts affected by the executing the second-type transaction based on a second current state of the blockchain in the blockchain network are determined. For example, once the second-type transaction is executed based on a second current state of the blockchain in the blockchain network, the one or more accounts affected by the executing the second-type transaction can be ascertained. In some implementations, the four groups 340a-d of second-type transactions are executed in parallel. For example, each of the second-type transactions 308*a-b* and 310*a-b* are executed based on a respective second current state of the blockchain in the blockchain network such as the current or latest state of the blockchain at the time of the actual execution of the respective second-type transactions (e.g., at the time of the parallel execution of each of the second-type transactions 308*a-b* and 310*a-b*). In some implementations, the second current state of the blockchain is different from the first current state of the blockchain in the blockchain network.

At 414, it is determined if the one or more accounts affected by the executing the second-type transaction are the same as the one or more accounts affected by the pre-executing the second-type transaction and if the one or more accounts affected by the executing the second-type transaction are not affected by any previously executed second-type transactions in the number of second-type transactions.

At 450, in response to determining that, for each of the number of second-type transactions, each of the one or more accounts affected by the executing the second-type transaction are the same as the one or more accounts affected by the pre-executing the second-type transaction and the one or more accounts affected by the executing the second-type transaction are not affected by any previously executed second-type transactions in the number of second-type transactions, the execution of the number of second-type transactions is committed. In some implementations, committing the execution of the number of second-type transactions can include one or more of writing the execution results of the number of second-type transactions into the blockchain of the blockchain network, or returning the execution results of the number of second-type transactions to one or more clients of the blockchain network.

At 418, in response to determining that, for one of the number of second-type transactions, the one or more accounts affected by the executing the second-type transaction are not the same as the one or more accounts affected by the pre-executing the second-type transaction, or the one or more accounts affected by the executing the second-type transaction are affected by any previously executed second-type transactions in the number of second-type transactions, the executing the second-type transaction is rolled back.

At 420, such a second-type transaction is re-executed after executing the one or more groups of transactions in parallel. In some implementations, such a second-type transaction can be identified as a failed second-type transaction (e.g., the second-type transaction 310*a* or 308*b* as shown in FIG. 3C).

In some implementations, one or more failed second-type transactions out of the number of second-type transactions can be identified, wherein for each of the one or more failed second-type transactions, one or more accounts affected by the executing the failed second-type transaction are not the same as one or more accounts affected by the pre-executing the failed second-type transaction or the one or more accounts affected by the executing the second-type transaction are affected by any previously executed second-type transactions in the number of second-type transactions. The one or more failed second-type transactions can be re-executed after executing the one or more groups of second-type transactions in parallel. In some implementations, all the failed second-type transactions can be added to a failed second-type transaction list. All the failed second-type transactions in the failed second-type transaction list can be re-executed in serial after executing the one or more groups of second-type transactions in parallel.

In some implementations, after the re-execution of the failed second-type transactions, the process 400 proceeds to 450 where the re-execution of failed second-type transactions transaction is committed.

In some implementations, the number of transactions are executed by the network node in a same order as the number of transactions are executed by any other network node of the number of network nodes of the blockchain network. For example, each network node can determine, according to a protocol used by each of the plurality of network nodes of the blockchain network, a sequential order of executing the one or more transactions within each of the one or more group; and a sequential order of executing the one or more failed second-type transactions after executing the one or more groups of transactions in parallel. In some implementations, as long as the number of transactions are grouped according to the same rule (e.g., based on accounts affected by the transactions), the execution order of transactions within the group is consistent, failed second-type transactions are rolled back and re-executed in serial after the actual execution of the other transactions, for example, according to a same rule, a consistent final execution result among all the network nodes in the blockchain network can be obtained.

Figure 5:
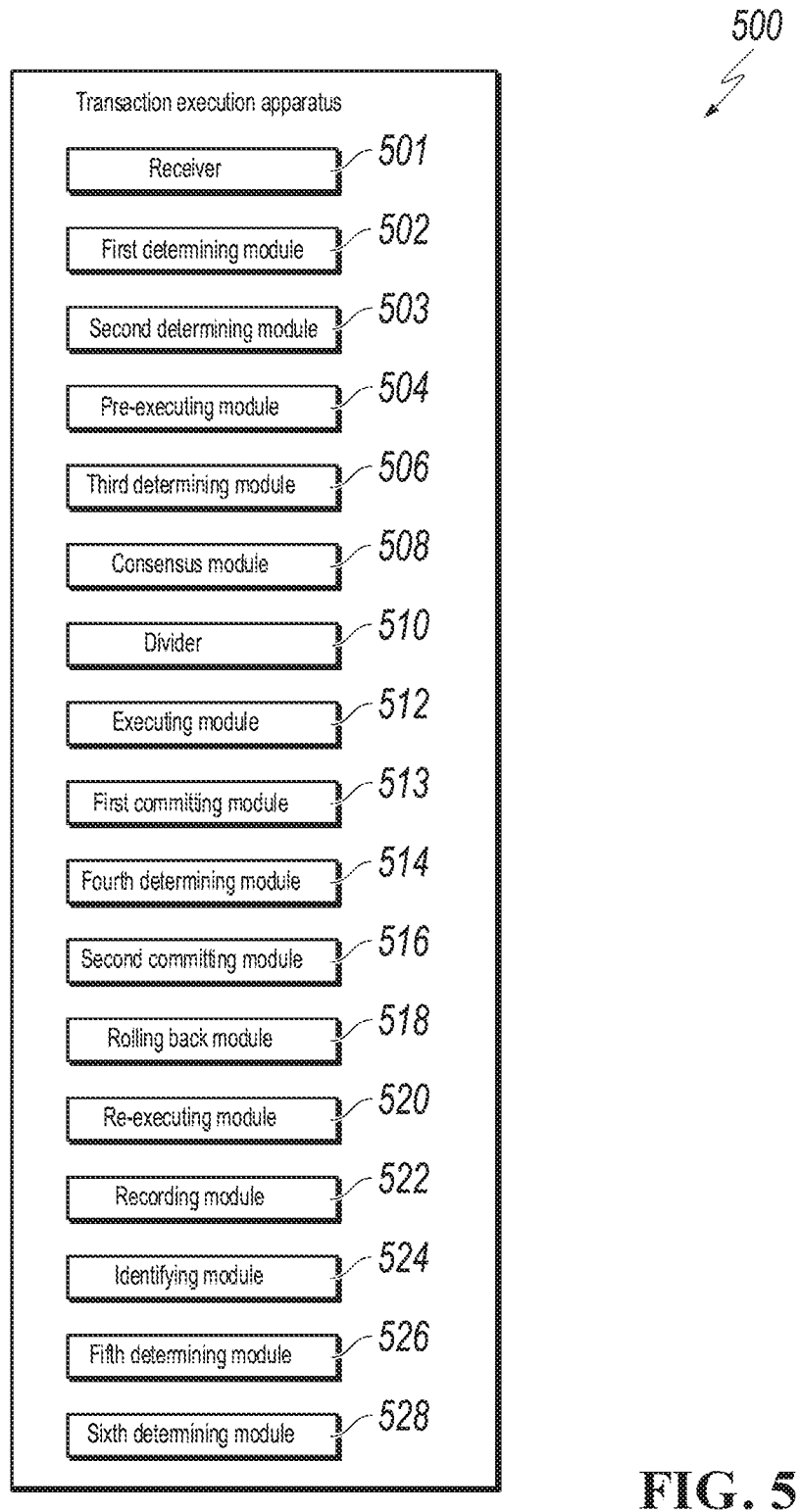
FIG. 5 depicts examples of modules of an apparatus in accordance with implementations of the specification.

FIG. 5 is a diagram of an example of modules of an apparatus 500 in accordance with implementations of this specification. The apparatus 500 can be an example implementation of a blockchain network node configured to perform parallel execution of smart contract transactions, wherein the blockchain network is a consortium blockchain network. The apparatus 500 can correspond to the implementations described above, and the apparatus 500 includes the following: a receiver or a receiving module 501, configured to receive a number of transactions; a first determining module 502, configured to determine whether the transaction is a first-type transaction or a second-type transaction; a second determining module 503, configured to, in response to determining that the transaction is a first-type transaction, determine one or more accounts affected by executing the first-type transaction; a pre-executing module 504, configured to, in response to determining that the transaction is a second-type transaction, pre-execute each of the number of second-type transactions based on a first current state of a blockchain in the blockchain network; a third determining module 506, configured to determine one or more accounts affected by the pre-executing the second-type transaction; a consensus module 508, configured to perform a consensus process of the number of transactions and the one or more accounts affected by the pre-executing the second-type transaction for each second-type transaction; a divider or dividing module 510, configured to divide the number of transactions into one or more groups of transactions based on the one or more accounts affected by executing the first-type transaction for each first-type transaction and the one or more accounts affected by the pre-executing the second-type transaction for each second-type transaction; an executing module 512, configured to execute the number of transactions by executing the one or more groups of transactions in parallel; a first committing module 513, configured to, for each first-type transaction, commit the executing the first-type transaction; a fourth determining module 514, configured to determine, for each second-type transaction, one or more accounts affected by the executing each of the number of second-type transactions, and determine if the one or more accounts affected by the executing the second-type transaction are the same as the one or more accounts affected by the pre-executing of the second-type transaction and if the one or more accounts affected by the executing the second-type transaction are not affected by any previously executed transactions in the number of transactions; and a second committing module 516, configured to commit the executing the second-type transaction in response to determining that the each of the one or more accounts affected by the executing the second-type transaction are the same as one or more accounts affected by the pre-executing of the second-type transaction and the one or more accounts affected by the executing the second-type transaction are not affected by any previously executed transactions in the number of transactions.

In an optional implementation, the apparatus 500 further includes the following: a rolling back module 518, configured to roll back the executing one of the number of second-type transactions in response to determining that, for one second-type transaction, the one or more accounts affected by the executing the second-type transaction are not the same as one or more accounts affected by the pre-executing of the second-type transaction or the one or more accounts affected by the executing the second-type transaction are affected by any previously executed transactions in the number of transactions; and a re-executing module 520, configured to re-execute the second-type transaction after executing the one or more groups of transactions in parallel.

In an optional implementation, the apparatus 500 further includes the following: a recording module 522, configured to record the one or more accounts affected by the pre-executing each of the number of second-type transactions for performing consensus of the one or more accounts affected by the pre-executing the second-type transaction.

In an optional implementation, the number of transactions are executed by the network node in a same order as the number of transactions are executed by any other network node of the number of network nodes of the blockchain network.

In an optional implementation, the apparatus 500 further includes the following: an identifying module 524, configured to identify one or more failed second-type transactions, wherein for each of the one or more failed second-type transactions, one or more accounts affected by the executing the failed second-type transaction are not the same as one or more accounts affected by the pre-executing of the failed second-type transaction or the one or more accounts affected by the executing the second-type transaction are not affected by any previously executed transactions in the number of transactions; and the re-executing module 520, configured to re-execute the one or more failed second-type transactions after executing the one or more groups of transactions in parallel.

In an optional implementation, the apparatus 500 further includes the following: a fifth determining module 526, configured to determine a sequential order of executing one or more transactions within each of the one or more groups; and a sixth determining module 528, configured to determine a sequential order of executing the one or more failed second-type transactions after executing the one or more groups of transactions in parallel.

In an optional implementation, each group of transactions includes one or more transactions that share a common transaction entity; and between each two different groups of transactions, any transaction in one group does not share any common transaction entity with any transaction in another group.

In an optional implementation, the common second-type transaction entity includes a transferee, a transferor, an account of a transferee, or an account of a transferor associated with a transaction.

In an optional implementation, a transaction for which all accounts affected by executing the transaction is deterministic before executing the transaction is a first-type transaction, and a transaction for which one or more accounts affected by executing the transaction is not deterministic before executing the transaction is a second-type transaction.

In an optional implementation, a non-smart-contract transaction is a first-type transaction and a smart contract transaction is a second-type transaction.

In an optional implementation, pre-executing, by the network node, second-type transaction comprises pre-executing the second-type transaction, by the network node, when one or more processors of the network node is idle.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 5, it can be interpreted as illustrating an internal functional module and a structure of a transaction execution apparatus. The transaction execution apparatus can be an example of a blockchain network node configured to perform parallel execution of smart contract transactions. The transaction execution apparatus can be an example of a blockchain network node configured to perform parallel execution of smart contract transactions. An execution body in essence can be an electronic device, and the electronic device includes the following: one or more processors; and a memory configured to store an executable instruction of the one or more processors.

The one or more processors are configured to receive a number of transactions to be executed in a blockchain network; for each of the number of transactions, determine whether the transaction is a first-type transaction or a second-type transaction; in response to determining that the transaction is a first-type transaction, determine one or more accounts affected by executing the first-type transaction; in response to determining that the transaction is a second-type transaction, pre-execute the second-type transaction based on a first current state of a blockchain in the blockchain network; and determine one or more accounts affected by the pre-executing the second-type transaction; perform a consensus process of the number of transactions and the one or more accounts affected by the pre-executing the second-type transaction for each second-type transaction; divide the number of transactions into one or more groups of transactions based on the one or more accounts affected by executing the first-type transaction for each first-type transaction and the one or more accounts affected by the pre-executing the second-type transaction for each second-type transaction; execute the number of transactions by executing one or more groups of transactions in parallel; for each first-type transaction, commit the executing the first-type transaction; for each second-type transaction, determine one or more accounts affected by the executing the second-type transaction based on a second current state of a blockchain in the blockchain network; and determine if the one or more accounts affected by the executing the second-type transaction are the same as the one or more accounts affected by the pre-executing of the second-type transaction and if the one or more accounts affected by the executing the second-type transaction are not affected by any previously executed transactions in the number of transactions; and in response to determining that the each of the one or more accounts affected by the executing the second-type transaction are the same as one or more accounts affected by the pre-executing of the second-type transaction and the one or more accounts affected by the executing the second-type transaction are not affected by any previously executed transactions in the number of transactions, commit the executing the second-type transaction.

Optionally, the one or more processors are configured to, in response to determining that, for one second-type transaction, the one or more accounts affected by the executing the second-type transaction are not the same as one or more accounts affected by the pre-executing of the second-type transaction or the one or more accounts affected by the executing the second-type transaction are affected by any previously executed transactions in the number of transactions, roll back the executing the second-type transaction; and execute the second-type transaction after executing the one or more groups of transactions in parallel.

Optionally, the one or more processors are configured to, for each second-type transaction, record the one or more accounts affected by the pre-executing the second-type transaction for performing consensus of the one or more accounts affected by the pre-executing the second-type transaction.

Optionally, the number of transactions are executed by a network node in a same order as the number of transactions are executed by any other network node of a number of network nodes of the blockchain network.

Optionally, the one or more processors are configured to, identify one or more failed second-type transactions, wherein for each of the one or more failed second-type transactions, one or more accounts affected by the executing the failed second-type transaction are not the same as one or more accounts affected by the pre-executing of the failed second-type transaction or the one or more accounts affected by the executing the second-type transaction are not affected by any previously executed transactions in the number of transactions; and execute the one or more failed second-type transactions after executing the one or more groups of transactions in parallel.

Optionally, the one or more processors are configured to, according to a protocol used by each of the plurality of network nodes of the blockchain network: determine a sequential order of executing one or more transactions within each of the one or more groups; and determine a sequential order of executing the one or more failed second-type transactions after executing the one or more groups of transactions in parallel.

Optionally, each group of transactions includes one or more transactions that affect a common transaction entity; and between each two different groups of transactions, any transaction in one group does not affect any common transaction entity with any transaction in another group.

Optionally, the common transaction entity includes a transferee, a transferor, an account of a transferee, or an account of a transferor associated with a transaction.

Optionally, a transaction for which all accounts affected by executing the transaction is deterministic before executing the transaction is a first-type transaction, and a transaction for which one or more accounts affected by executing the transaction is not deterministic before executing the transaction is a second-type transaction.

Optionally, a non-smart-contract transaction is a first-type transaction and a smart contract transaction is a second-type transaction.

Optionally, wherein pre-executing, by the network node, second-type transaction comprises pre-executing the second-type transaction, by the network node, when one or more processors of the network node is idle.

The techniques described in this specification produce several technical effects. For example, the specification discloses techniques that allow parallel execution of transactions in a distributed ledger system while guaranteeing the same execution order of the transactions performed by each network node of the distributed ledger system to ensure consistency of execution results of the transactions in the distributed ledger system. For example, smart contract transactions that can be executed in parallel are grouped together, for example, based on pre-execution results of the smart contract transactions. The technical effects and advantages are achieved, inter alia, by putting in different groups transactions that do not affect any common transaction entity or have dependency on one another (e.g., do not affect the same accounts in the blockchain network). Thus, the technique identifies groups of transactions can be executed in parallel with each other. In the case of smart contract transactions, if the actual execution of one or more smart contract transactions affects different accounts than were identified by the pre-execution of the one or more smart contract transactions, the execution of the one or more smart contract transactions is rolled back or undone, and then re-executed in serial after parallel execution of the rest smart contract transactions, thereby ensuring the correctness of the results at a modest computational cost relative to the benefit of generally parallel execution.

The described techniques thus can improve the processing speed of the transactions and increase transaction throughput in a blockchain network. For example, pre-execution of the smart contract transactions can be done by a network node when one or more processors of the network node is idle, which make better use of the computational resources or processing power of the network node without introducing additional delay or latency. By dividing the transactions into different groups after achieving a consensus by performing a consensus process and before executing the transactions, the multiple groups of transactions can be executed independently in parallel by taking advantage of a multi-processor or multi-core network node or multiple computers in a cluster of computers to increase the execution speed of the network node and the efficiency of the overall blockchain network. Moreover, the described techniques do not require entry (e.g., manually) of a list of accounts of affected by the execution of the smart contract transactions, thus is not subject to possibility of entry errors or the unpredictability of affected accounts of certain smart contract transactions.

Described implementations of the subject matter can include one or more features, alone or in combination.

For example, in a first implementation, a method for executing a number of transactions in a blockchain network, wherein the blockchain network includes a number of network nodes, the method includes receiving, by a network node of the blockchain network, a number of transactions to be executed in a blockchain network; for each of the number of transactions, determining whether the transaction is a first-type transaction or a second-type transaction; in response to determining that the transaction is a first-type transaction, determining, by the network node, one or more accounts affected by executing the first-type transaction; in response to determining that the transaction is a second-type transaction, pre-executing, by the network node, the second-type transaction based on a first current state of a blockchain in the blockchain network; and determining, by the network node, one or more accounts affected by the pre-executing the second-type transaction; performing a consensus process of the number of transactions and the one or more accounts affected by the pre-executing the second-type transaction for each second-type transaction; dividing, by the network node, the number of transactions into one or more groups of transactions based on the one or more accounts affected by executing the first-type transaction for each first-type transaction and the one or more accounts affected by the pre-executing the second-type transaction for each second-type transaction; executing the number of transactions by executing one or more groups of transactions in parallel.

The foregoing and other described implementations can each, optionally, include one or more of the following features:

A first feature, combinable with any of the following features, further including: for each first-type transaction, committing the executing the first-type transaction; for each second-type transaction, determining one or more accounts affected by the executing the second-type transaction based on a second current state of a blockchain in the blockchain network; and determining if the one or more accounts affected by the executing the second-type transaction are the same as the one or more accounts affected by the pre-executing of the second-type transaction and if the one or more accounts affected by the executing the second-type transaction are not affected by any previously executed transactions in the number of transactions; and in response to determining that the each of the one or more accounts affected by the executing the second-type transaction are the same as one or more accounts affected by the pre-executing of the second-type transaction and the one or more accounts affected by the executing the second-type transaction are not affected by any previously executed transactions in the number of transactions, committing the executing the second-type transaction.

A second feature, combinable with any of the following features, further including: in response to determining that, for one second-type transaction, the one or more accounts affected by the executing the second-type transaction are not the same as one or more accounts affected by the pre-executing of the second-type transaction or the one or more accounts affected by the executing the second-type transaction are affected by any previously executed transactions in the number of transactions, roll back the executing the second-type transaction; and execute the second-type transaction after executing the one or more groups of transactions in parallel.

A third feature, combinable with any of the following features, further including: for each second-type transaction, record the one or more accounts affected by the pre-executing the second-type transaction for performing consensus of the one or more accounts affected by the pre-executing the second-type transaction.

A fourth feature, combinable with any of the following features, wherein the number of transactions are executed by a network node in a same order as the number of transactions are executed by any other network node of a number of network nodes of the blockchain network.

A fifth feature, combinable with any of the following features, further including: identify one or more failed second-type transactions, wherein for each of the one or more failed second-type transactions, one or more accounts affected by the executing the failed second-type transaction are not the same as one or more accounts affected by the pre-executing of the failed second-type transaction or the one or more accounts affected by the executing the second-type transaction are not affected by any previously executed transactions in the number of transactions; and execute the one or more failed second-type transactions after executing the one or more groups of transactions in parallel.

A sixth feature, combinable with any of the following features, further including: according to a protocol used by each of the plurality of network nodes of the blockchain network: determine a sequential order of executing one or more transactions within each of the one or more groups; and determine a sequential order of executing the one or more failed second-type transactions after executing the one or more groups of transactions in parallel.

A seventh feature, combinable with any of the following features, wherein: each group of transactions includes one or more transactions that affect a common transaction entity; and between each two different groups of transactions, any transaction in one group does not affect any common transaction entity with any transaction in another group.

An eighth feature, combinable with any of the following features, wherein the common transaction entity includes a transferee, a transferor, an account of a transferee, or an account of a transferor associated with a transaction.

A ninth feature, combinable with any of the following features, wherein: a transaction for which all accounts affected by executing the transaction is deterministic before executing the transaction is a first-type transaction, and a transaction for which one or more accounts affected by executing the transaction is not deterministic before executing the transaction is a second-type transaction.

A tenth feature, combinable with any of the following features, wherein a non-smart-contract transaction is a first-type transaction and a smart contract transaction is a second-type transaction.

An eleventh feature, combinable with any of the following features, wherein pre-executing, by the network node, second-type transaction comprises pre-executing the second-type transaction, by the network node, when one or more processors of the network node is idle.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for executing a plurality of transactions in a blockchain network, wherein the blockchain network comprises a plurality of network nodes, the method comprising:
   receiving, by a network node of the blockchain network, a plurality of transactions to be executed in a blockchain network;
   for each of the plurality of transactions, determining that the transaction is a first-type transaction or a second-type transaction;
   dividing, by the network node, the plurality of transactions into one or more groups of transactions based on one or more accounts affected by executing the first-type transaction for each first-type transaction and one or more accounts affected by pre-executing the second-type transaction for each second-type transaction;
   arranging, by the network node, each of the one or more groups of transactions that affect the one or more accounts by executing the first-type transactions into a first-type transaction group and each of the one or more groups of transactions that affect the one or more accounts by executing the second-type transactions into a second-type transaction group;
   arranging, by the network node, the first-type transaction group and the second- type transaction group in a parallel execution order so that the one or more accounts affected by each of the plurality of transactions in the first-type transaction group are not affected by the one or more accounts affected by each of the plurality of transactions in the second-type transaction group; and
   executing the plurality of transactions by executing, in parallel, the one or more groups of transactions.

2. The method of claim 1, further comprising:
   prior to executing the plurality of transactions, for each second-type transaction, recording the one or more accounts affected by the pre-executing the second-type transaction for performing consensus of the one or more accounts affected by the pre-executing the second-type transaction.

3. The method of claim 1, wherein the plurality of transactions are executed by the network node in a same order as the plurality of transactions are executed by any other network node of the plurality of network nodes of the blockchain network.

4. The method of claim 1, wherein:
   each group of transactions comprises one or more transactions that affect a common transaction entity; and
   between each two different groups of transactions, any transaction in one group does not affect any common transaction entity with any transaction in another group.

5. The method of claim 4, wherein the common transaction entity comprises a transferee, a transferor, an account of a transferee, or an account of a transferor associated with a transaction.

6. The method of claim 1, wherein:
   a transaction for which all accounts affected by executing the transaction is deterministic before executing the transaction is a first-type transaction, and
   a transaction for which one or more accounts affected by executing the transaction is not deterministic before executing the transaction is a second-type transaction.

7. The method of claim 1, wherein a non-smart-contract transaction is a first-type transaction and a smart contract transaction is a second-type transaction.

8. The method of claim 1, wherein pre-executing the second-type transaction comprises pre-executing the second-type transaction, by the network node, when one or more processors of the network node is idle.

9. A non-transitory, computer-readable storage medium storing one or more instructions executable by a computer system to perform operations for executing a plurality of transactions in a blockchain network, wherein the blockchain network comprises a plurality of network nodes, the operations comprising:
   receiving, by a network node of the blockchain network, a plurality of transactions to be executed in a blockchain network;
   for each of the plurality of transactions, determining that the transaction is a first-type transaction or a second-type transaction;
   dividing, by the network node, the plurality of transactions into one or more groups of transactions based on one or more accounts affected by executing the first-type transaction for each first-type transaction and one or more accounts affected by pre-executing the second-type transaction for each second-type transaction, arranging, by the network node, each of the one or more groups of transactions that affect the one or more accounts by executing the first-type transactions into a first-type transaction group and each of the one or more groups of transactions that affect the one or more accounts by executing the second-type transactions into a second-type transaction group;

arranging, by the network node, the first-type transaction group and the second-type transaction group in a parallel execution order so that the one or more accounts affected by each of the plurality of transactions in the first-type transaction group are not affected by the one or more accounts affected by each of the plurality of transactions in the second-type transaction group; and executing the plurality of transactions by executing, in parallel, the one or more groups of transactions.

10. The non-transitory, computer-readable storage medium of claim 9, the operations further comprising:

prior to executing the plurality of transactions, for each second-type transaction, recording the one or more accounts affected by the pre-executing the second-type transaction for performing consensus of the one or more accounts affected by the pre-executing the second-type transaction.

11. The non-transitory, computer-readable storage medium of claim 9, wherein the plurality of transactions are executed by the network node in a same order as the plurality of transactions are executed by any other network node of the plurality of network nodes of the blockchain network.

12. The non-transitory, computer-readable storage medium of claim 9, wherein:

each group of transactions comprises one or more transactions that affect a common transaction entity; and between each two different groups of transactions, any transaction in one group does not affect any common transaction entity with any transaction in another group.

13. The non-transitory, computer-readable storage medium of claim 12, wherein the common transaction entity comprises a transferee, a transferor, an account of a transferee, or an account of a transferor associated with a transaction.

14. The non-transitory, computer-readable storage medium of claim 9, wherein:

a transaction for which all accounts affected by executing the transaction is deterministic before executing the transaction is a first-type transaction, and a transaction for which one or more accounts affected by executing the transaction is not deterministic before executing the transaction is a second-type transaction.

15. The non-transitory, computer-readable storage medium of claim 9, wherein a non-smart-contract transaction is a first-type transaction and a smart contract transaction is a second-type transaction.

16. The non-transitory, computer-readable storage medium of claim 9, wherein pre-executing the second-type transaction comprises pre-executing the second-type transaction, by the network node, when one or more processors of the network node is idle.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for executing a plurality of transactions in a blockchain network, wherein the blockchain network comprises a plurality of network nodes, the operations comprising:

receiving, by a network node of the blockchain network, a plurality of transactions to be executed in a blockchain network;

for each of the plurality of transactions, determining that the transaction is a first-type transaction or a second-type transaction;

dividing, by the network node, the plurality of transactions into one or more groups of transactions based on one or more accounts affected by executing the first-type transaction for each first-type transaction and one or more accounts affected by pre-executing the second-type transaction for each second-type transaction;

arranging, by the network node, each of the one or more groups of transactions that affect the one or more accounts by executing the first-type transactions into a first-type transaction group and each of the one or more groups of transactions that affect the one or more accounts by executing the second-type transactions into a second-type transaction group;

arranging, by the network node, the first-type transaction group and the second-type transaction group in a parallel execution order so that the one or more accounts affected by each of the plurality of transactions in the first-type transaction group are not affected by the one or more accounts affected by each of the plurality of transactions in the second-type transaction group; and executing the plurality of transactions by executing, in parallel, the one or more groups of transactions.

18. The computer-implemented system of claim 17, the operations further comprising:

prior to executing the plurality of transactions, for each second-type transaction, recording the one or more accounts affected by the pre-executing the second-type transaction for performing consensus of the one or more accounts affected by the pre-executing the second-type transaction.

19. The computer-implemented system of claim 17, wherein the plurality of transactions are executed by the network node in a same order as the plurality of transactions are executed by any other network node of the plurality of network nodes of the blockchain network.

20. The computer-implemented system of claim 17, wherein:

each group of transactions comprises one or more transactions that affect a common transaction entity; and between each two different groups of transactions, any transaction in one group does not affect any common transaction entity with any transaction in another group.

* * * * *